(12) United States Patent
Standal et al.

(10) Patent No.: US 10,717,133 B2
(45) Date of Patent: Jul. 21, 2020

(54) ESTIMATION OF ORIENTATION OF A CUTTING TOOL

(71) Applicant: SANDVIK INTELLECTUAL PROPERTY AB, Sandviken (SE)

(72) Inventors: Oddvar Standal, Trondheim (NO); Mathias Tjomsland, Trondheim (NO); Ole Henrik Johansen, Jakobsli (NO); Dan Ostling, Trondheim (NO); Tormod Jensen, Ranheim (NO)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 16/331,783

(22) PCT Filed: Aug. 18, 2017

(86) PCT No.: PCT/EP2017/070911
§ 371 (c)(1),
(2) Date: Mar. 8, 2019

(87) PCT Pub. No.: WO2018/046281
PCT Pub. Date: Mar. 15, 2018

(65) Prior Publication Data
US 2019/0201984 A1 Jul. 4, 2019

(30) Foreign Application Priority Data
Sep. 9, 2016 (EP) .................................... 16188131

(51) Int. Cl.
*B23B 25/06* (2006.01)
*B23Q 17/22* (2006.01)
(Continued)

(52) U.S. Cl.
CPC ............ *B23B 25/06* (2013.01); *B23B 27/007* (2013.01); *B23Q 17/12* (2013.01);
(Continued)

(58) Field of Classification Search
CPC . B23B 2260/128; B23B 25/06; B23B 27/007; B23Q 17/12; B23Q 17/2225; B23Q 2717/003
See application file for complete search history.

(56) References Cited

U.S. PATENT DOCUMENTS 4,587,697 A * 5/1986 Link ................... B23B 11/00
29/27 C
4,646,595 A * 3/1987 Slee ................... B23B 29/125
318/571

(Continued)

FOREIGN PATENT DOCUMENTS

DE 630722 C 6/1936
DE 213146 A1 9/1984
WO 2005042195 A1 5/2005

*Primary Examiner* — Sara Addisu
(74) *Attorney, Agent, or Firm* — Corinne R. Gorski

(57) ABSTRACT

A cutting tool, a turning machine including the cutting tool, and an associated method are provided. The cutting tool includes a tool bar extending along an axis, a cutting head located at the tool bar, and at least one sensor integrated with the tool bar or the cutting head. A rotational orientation of the cutting tool with respect to the axis is estimated based on output provided by the at least one sensor. In at least some embodiments, the at least one sensor includes accelerometers configured to measure acceleration in at least two directions.

12 Claims, 3 Drawing Sheets

(51) Int. Cl.
*B23Q 17/12* (2006.01)
*B23B 27/00* (2006.01)

(52) U.S. Cl.
CPC .... *B23Q 17/2225* (2013.01); *B23B 2260/128* (2013.01); *B23Q 2717/003* (2013.01)

(56) References Cited

U.S. PATENT DOCUMENTS

| | | | |
|---|---|---|---|
| 5,810,528 A | 11/1998 | O'Connor et al. | |
| 5,842,392 A * | 12/1998 | Pfeifer | B23B 3/168 |
| | | | 82/1.11 |
| 5,947,658 A * | 9/1999 | Eysel | B23B 29/03457 |
| | | | 408/147 |
| 6,122,999 A * | 9/2000 | Durazo | B24B 13/046 |
| | | | 82/1.11 |
| 6,257,109 B1 * | 7/2001 | Shinohara | B23B 3/162 |
| | | | 82/1.11 |
| 6,352,496 B1 * | 3/2002 | Oldani | B23Q 1/52 |
| | | | 409/165 |
| 6,817,111 B1 | 11/2004 | Corrado | |
| 9,242,329 B2 | 1/2016 | Vedel | |
| 2002/0170397 A1 * | 11/2002 | Sauter | B23Q 1/0009 |
| | | | 29/40 |
| 2005/0188798 A1 * | 9/2005 | Bischof | B23B 5/36 |
| | | | 82/1.11 |
| 2006/0219066 A1 * | 10/2006 | Nicholl | B23B 41/04 |
| | | | 82/1.11 |
| 2007/0056179 A1 | 3/2007 | Beall | |
| 2007/0221020 A1 * | 9/2007 | D'Antonio | B23B 25/06 |
| | | | 82/118 |
| 2009/0107309 A1 * | 4/2009 | Greenwald | B23B 5/04 |
| | | | 82/118 |
| 2009/0133239 A1 * | 5/2009 | Tanaka | B23B 25/06 |
| | | | 29/48.5 R |
| 2014/0030037 A1 * | 1/2014 | Jensen | B23B 27/10 |
| | | | 408/60 |
| 2016/0045994 A1 | 2/2016 | Jayr et al. | |
| 2016/0348500 A1 * | 12/2016 | Piscsalko | G01V 9/00 |
| 2017/0209974 A1 * | 7/2017 | Angel | B23Q 17/0985 |
| 2018/0221965 A1 * | 8/2018 | Vezzoli | B23B 31/107 |
| 2018/0326511 A1 * | 11/2018 | Vezzoli | B23C 5/26 |
| 2019/0001456 A1 * | 1/2019 | Kalhori | B23B 49/001 |
| 2019/0126357 A1 * | 5/2019 | Allyn | B23Q 15/24 |

\* cited by examiner

ESTIMATION OF ORIENTATION OF A CUTTING TOOL

RELATED APPLICATION DATA

This application is a § 371 National Stage Application of PCT International Application No. PCT/EP2017/070911 filed Aug. 18, 2017 claiming priority to EP 16188131.3 filed Sep. 9, 2016.

TECHNICAL FIELD

The present disclosure generally relates to cutting tools for use in turning, and in particular to estimation of orientation of such cutting tools.

BACKGROUND

In machines for metal cutting such as machine tools, especially turning machines (such as lathes), material is typically removed (or cut) from an exterior or interior surface of a work piece by rotating the work piece and by moving a cutting tool towards the work piece in an axial and/or radial direction. The case where the cutting action provided by the cutting edge of the cutting tool is performed on an interior surface of the work piece (i.e. from inside a hole of the work piece) is sometimes referred to as boring. Knowledge of the position and orientation of the cutting edge of the cutting tool is important for providing high precision machining. In some cases, even a small deviation in the position or orientation of the cutting edge may reduce the machining precision below an acceptable level. The cutting edge of the cutting tool is often a cutting edge of an insert mounted at a cutting head of the cutting tool. The orientation of the cutting edge may for example be determined via knowledge of the orientation of the cutting tool, or by measuring the orientation of the cutting edge itself. Some cutting tools have a planar surface on which a spirit level may be placed for checking that the cutting tool has been mounted at the correct orientation. However, this may require the user to adjust the orientation of the cutting tool by one hand while the other hand holds the spirit level in position. Generally, the process of establishing proper orientation of the cutting tool may be complicated and/or time consuming. It may for example require certain skill by the person mounting the cutting tool. It would therefore be advantageous to provide a new way to estimate the orientation of cutting tools.

SUMMARY

To better address one or more of the above-mentioned issues, cutting tools and methods are provided.

Hence, according to a first aspect, a cutting tool for use in turning is provided. The cutting tool comprises a tool bar, a cutting head and at least one sensor. The tool bar extends along an axis. The cutting head is located (or positioned) at the tool bar. The at least one sensor is integrated with the tool bar or the cutting head. The at least one sensor is arranged to, and is of a type to, provide output enabling estimation of a rotational orientation of the cutting tool with respect to (or relative to) the axis.

As the output provided by the at least one sensor enables estimation of the rotational orientation of the cutting tool with respect to the axis (or the rotational orientation of the cutting tool around the axis, for example relative to a desired orientation), there is no need for additional external sensors, such as a spirit level manually placed on top of the cutting tool for checking whether or not the cutting tool is level. Integration of the at least sensor with the tool bar or cutting head facilitates mounting (or orientation) of the cutting tool as there is no need to correctly arrange or align additional sensors for estimating the rotational orientation of the cutting tool with respect to the axis.

It will be appreciated that the at least one sensor is arranged (or positioned and/or oriented) in such a way that, and is of such a type that, it is able to provide output enabling estimation of a rotational orientation of the cutting tool with respect to the axis. In other words, not only does the at least one sensor need to be of a suitable type, it also needs to be suitably arranged for it to be able to provide output enabling estimation of a rotational orientation of cutting tool with respect to the axis.

Throughout the present disclosure, the word "turning" refers to a machining process in which a work piece is rotated, and in which material is cut from the work piece by a cutting edge (for example mounted at the cutting head of the cutting tool) which does not rotate. During such a machining process, the cutting edge may for example be translated towards the rotating work piece to perform the cutting action, or the rotating work piece may be translated towards the cutting edge.

It will be appreciated that turning may for example be performed at an exterior surface of a work piece or at an interior surface of a work piece (sometimes also referred to as boring).

The axis may for example be the main direction along which the tool bar extends. The tool bar may for example be cylindrical and the axis may for example be the axis of symmetry of the tool bar. Even if the entire tool bar need not necessarily be straight, the tool bar may still extend along the axis in the sense that the axis is parallel (or at least substantially parallel) to a main portion of the tool bar.

The axis may for example be horizontal. The axis may for example be parallel to (or orthogonal to) an axis of rotation for a work piece to be rotated during turning.

Although the tool bar extends along the axis when not in use, the tool bar may bend (or be deflected) during turning due to interaction with a work piece. Part of the tool bar may therefore deviate somewhat (for example a few millimeters) from the axis during turning. The rotational orientation of the tool bar may for example be estimated based on output from the at least sensor obtained prior to turning.

The cutting tool (or turning tool) may for example be suitable for use in a turning machine.

The cutting head may for example be mounted at the tool bar or may be an integrated part of the tool bar.

The cutting head may for example comprise a cutting edge, or may be suitable for holding (or mounting) a cutting edge. The cutting head may for example be arranged for holding (or mounting) an insert having a cutting edge. The cutting head may for example be a dummy cutting head (or fake cutting head) which is only intended for orienting the cutting tool, and which is not suitable for holding an insert. The dummy cutting head may for example be mounted at the tool bar just like an ordinary cutting head, and may be replaced by an ordinary cutting head once a suitable orientation of the cutting tool has been obtained.

The at least one sensor may for example be integrated in (or within) the tool bar or the cutting head.

According to some embodiments, the at least one sensor may be oriented to, and may be of a type to, provide output enabling estimation of a rotational orientation of the cutting tool with respect to the axis. In other words, the at least one sensor may be oriented in such a way that, and may be of such a type that, it is able to provide output enabling estimation of a rotational orientation of the cutting tool with respect to the axis.

According to some embodiments, the at least one sensor may comprise an accelerometer, a gyroscope, a digital spirit level, an analog spirit level, or a plumb bob.

Depending on the type of sensor (such as accelerometer or gyroscope), the position and/or orientation suitable for the at least one sensor to be able to provide the required output (i.e. output enabling estimation of the rotational orientation of the cutting tool relative to the axis) may for example be different.

It is relatively easy to manufacture accelerometers of a size, precision and/or durability suitable for use in a cutting tool. Such accelerometers may therefore be a cost-efficient way to estimate the orientation of the cutting tool.

The accelerometer may for example be located at (or close to) the front end of the tool bar. The accelerometer may then also be employed for estimating vibrations of a cutting edge of the cutting tool during turning. A distance from the accelerometer to a machine interface for mounting the cutting tool in a turning machine may for example be at least 2, 3, 4, 5 or 10 times as long as a distance from the accelerometer to a cutting edge of the cutting tool.

According to some embodiments, the at least one sensor may be arranged in an interior of the tool bar or in an interior of the cutting head. Sensors arranged in the interior of the tool bar or the cutting head may for example be protected from chips created during interaction of the cutting tool and a work piece.

According to some embodiments, the at least one sensor may comprise accelerometers configured to measure acceleration in at least two directions. As the gravitational field of the earth is known, accelerations measured in different directions at the cutting tool may be employed to determine the orientation of the cutting tool. Accelerations measured in two directions may for example be sufficient to determine the rotational orientation of the cutting tool with respect to the axis.

The accelerations may for example be measured when the cutting tool is at rest, i.e. when it is not being employed for cutting material from a work piece during turning.

The directions may for example be transverse (or non-parallel) to each other. The directions may for example be perpendicular (or orthogonal) to each other.

The directions may for example be transverse (or non-parallel) to the axis. The directions may for example be perpendicular (or orthogonal) to the axis.

The accelerometers may for example be located at (or close to) the front end of the tool bar. The accelerometers may then also be employed for estimating vibrations of a cutting edge of the cutting tool during turning. A distance from the accelerometers to a machine interface for mounting the cutting tool in a turning machine may for example be at least 2, 3, 4, 5 or 10 times as long as a distance from the accelerometers to a cutting edge of the cutting tool.

The at least one sensor may for example comprise accelerometers configured to measure accelerations in three or more directions. Accelerations measured in more than two directions (such as in three directions) may for example be employed to determine the rotational orientation of the cutting tool with respect to the axis.

According to a second aspect, there is provided a turning machine comprising the cutting tool as defined in any of the embodiments of the first aspect. The turning machine may be adapted to estimate (or determine), using the output provided by the at least one sensor, a rotational orientation of the cutting tool with respect to the axis.

As the turning machine is able to estimate (or compute) the orientation itself, there is no need to prepare (or program) an external computing device (such as a computer or hand held device) to correctly interpret the output provided by the at least one sensor, so as to be able to estimate the rotational orientation of the cutting tool with respect to the axis.

The turning machine may for example be a lathe.

The turning machine may for example comprise a spindle for rotating a work piece.

According to some embodiments, the turning machine may comprise a user interface configured to indicate the estimated orientation to a user.

The user interface may for example comprise a display (or screen) for visually indicating the estimated orientation.

The user interface may for example be adapted to indicate the estimated orientation via sound.

The estimated orientation may for example be indicated in the form of a visual or audio indication provided in case the estimated orientation is close enough to a reference (or desired) orientation. A different indication (or no indication at all) may for example be provided in case the estimated orientation is not close enough to the reference orientation.

According to some embodiments, the turning machine may comprise a communication interface configured to provide signaling indicating the estimated orientation.

The signaling may for example be provided in the form of wired and/or wires signals.

The signaling may for example be provided to a user interface of the turning machine or to a remotely located device, such as a computer or hand-held device.

According to some embodiments, the turning machine may comprise a processing section (or processor, or processing device) configured to estimate, using the output provided by the at least one sensor, the rotational orientation of the cutting tool with respect to the axis.

According to a third aspect, there is provided a method. The method comprises providing a cutting tool for use in turning. The cutting tool comprises a tool bar extending along an axis, a cutting head located at the tool bar, and at least one sensor integrated with the tool bar or the cutting head. The method comprises providing output by the at least one sensor. The method comprises estimating, based on the output provided by the at least one sensor, a rotational orientation of the cutting tool with respect to the axis.

The advantages presented above for features of cutting tools according to the first aspect, and turning machines according to the second aspect, may generally be valid for the corresponding features of methods according to the third aspect.

According to some embodiments, the method may comprise indicating the estimated orientation to a user.

The estimated orientation may for example be indicated via a user interface of a turning machine in which the cutting tool is arranged, or via a user interface of a separate device (such as a hand held device).

According to some embodiments, the method may comprise obtaining a reference rotational orientation with respect to the axis, and indicating, to the user, a relation between the estimated orientation and the reference orientation.

The method may for example comprise indicating whether the estimated orientation is within a tolerance region (or tolerance interval) around the reference orientation.

According to some embodiments, the reference orientation may be a selected reference orientation among a plurality of available reference orientations.

The reference orientation may for example be selected by a user.

The reference orientation may for example be selected based on the type of turning machine in which the cutting tool is employed.

According to some embodiments, the at least one sensor may comprise accelerometers. Providing output by the at least one sensor may comprise measuring acceleration in at least two directions.

According to some embodiments, the at least one sensor may comprise accelerometers configured to measure acceleration in at least two fixed directions relative to the cutting tool. Prior to providing the output, the method may comprise arranging the cutting tool at a reference rotational orientation with respect to the axis, measuring, using the accelerometers, reference accelerations in the at least two fixed directions, computing, based on the measured reference accelerations, a parameter value indicative of a mounting angle of at least one of the accelerometers relative to the cutting tool (or relative to a cutting edge of the cutting tool), and arranging the cutting tool at a new rotational orientation with respect to the axis. Estimating the rotational orientation of the cutting tool with respect to the axis may comprise estimating, based on the output provided by the at least one sensor and based on the parameter value, a rotational orientation of the cutting tool with respect to the axis.

The cutting tool may for example be arranged at the reference orientation for calibrating the accelerometers. This may for example be done during manufacture or assembly of the cutting tool. The calibration may for example be expressed in terms of the computed parameter value. When the cutting tool is later mounted in a turning machine, the cutting tool may be oriented at a new (e.g. unknown) rotational orientation with respect to the axis. The parameter value obtained during calibration may then be employed together with output from the accelerometers to estimate (or determine) the new orientation of the cutting tool.

If the estimated rotational orientation indicates that the new rotational orientation deviates too much from a desired rotational orientation, the cutting tool may for example be rotated with respect to the axis for modifying the rotational orientation of the cutting tool.

It is noted that embodiments of the present disclosure relate to all possible combinations of features recited in the claims. Further, it will be appreciated that the various embodiments described for the cutting tool according to the first aspect, or the turning machine according to the second aspect, are all combinable with embodiments of the method according to the third aspect.

BRIEF DESCRIPTION OF THE DRAWINGS

In what follows, example embodiments will be described in greater detail and with reference to the accompanying drawings, on which.

All the figures are schematic and generally only show parts which are necessary in order to elucidate the respective embodiments, whereas other parts may be omitted or merely suggested.

DETAILED DESCRIPTION

Figure 1:
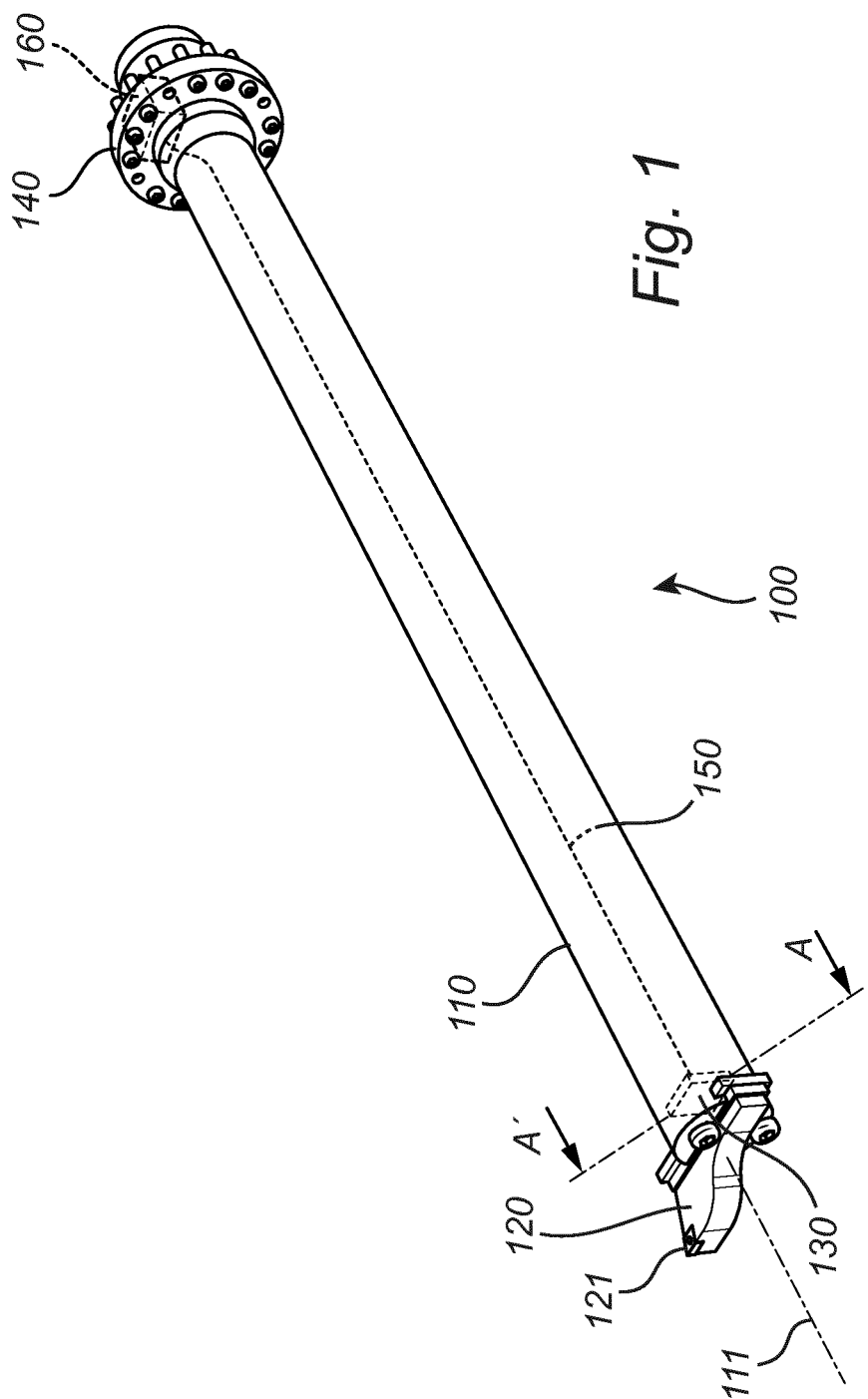
FIG. 1 is a perspective view of a cutting tool, according to an embodiment.

FIG. 1 is a perspective view of a cutting tool 100, according to an embodiment. The cutting tool 100 is a cutting tool adapted for the well-known machining process called turning. The cutting tool 100 comprises a tool bar 110 (which may also be referred to as a turning bar 110), a cutting head 120, and at least one sensor 130. The tool bar 110 extends along an axis 111. The cutting head 120 is located at the tool bar 110. The sensors 130 are integrated with the tool bar 110 or integrated with the cutting head 120. The sensors 130 are arranged to, and are of a type to, provide output enabling estimation of a rotational orientation of the cutting tool 100 with respect to the axis 111 (or with respect to the gravitational field).

The tool bar 100 is an elongate element or elongate member. In the present embodiment, the tool bar 110 is a cylindrical element extending along the axis 111. The cutting head 120 is arranged or mounted at one end of the tool bar 110. Embodiments may also be envisaged in which the cutting head 120 is arranged close to the end f the tool bar 110, for example behind a damper.

In the present embodiment, a machine interface 140 is arranged at the other end of the tool bar 110 for mounting the cutting tool 100 in a turning machine. An insert 121 is mounted at the cutting head 120. The insert 121 has one or more cutting edges for cutting away material (for example metal) from a work piece. The cutting tool 100 may be employed for external turning wherein material from an external surface of a work piece is removed. As the cutting head 120 is located at the end of the tool bar 110, cutting tool 100 may also be employed for internal turning wherein material from an internal surface of a work piece (for example within a hole of the work piece) is removed. Internal turning is sometimes also called boring.

Embodiments may also be envisaged in which the tool bar 110 has machine interfaces 140 at both ends, and where the cutting head 120 is located along the tool bar 110, for example at the middle of the tool bar 110. However, such embodiments in which the cutting head 120 is not placed close to an end of the tool bar 110 may not be as suitable for interior turning, as the embodiment described with reference to FIG. 1. In some embodiments, the cutting head 120 may be integrated with the tool bar 110 rather than being mounted at (or attached to) the tool bar 110.

The tool bar 110 may for example comprise a metal such as steel, and/or cemented carbide. The cutting head 120 may for example comprise metal such as steel. The insert 121 may for example comprise cemented carbide. The insert 121 may be adapted for metal cutting.

In the present embodiment, the sensors 130 are integrated with the tool bar 110, at a position close to the cutting head 120. Embodiments may also be envisaged in which the sensors 130 are located at other positions along the tool bar 110, or where the sensors 130 are integrated with the cutting head 120 (for example in the insert 121).

The cutting head 120 may for example be removable from the tool bar 110, so as to be replaceable by other cutting heads. The sensors 130 may for example be integrated with a special cutting head 120 which is adapted to be mounted at several different types of tool bars 110, so that a single cutting head 120 may be employed for estimating rotational orientations of different cutting tools 100. Such a special cutting head 120 may for example be provided in a kit delivered separately from the rest of the cutting tool 100. The tool bar 110 may for example be threaded or serrated at its end for attaching the cutting head 120. The mechanical interface employed for attaching the cutting head 120 to the tool bar 110 may also provide an orientation reference from the cutting head 120 to the tool bar 110 (and/or from the sensors 130 to the tool bar 110).

In the embodiment described with reference to FIG. 1, the sensors 130 are located in the interior of the tool bar 110. The sensors 130 are therefore protected from metal chips created during machining. Embodiments may also be envisaged in which the sensors 130 are located along the exterior surface of the tool bar 110 (preferably some distance from the insert 121 so as to avoid contact with metal chips created when the insert 121 interacts with a work piece) or in the interior of the cutting head 120.

Output from the sensors 130 may for example be transmitted wirelessly, or via a wire 150, to a processing section 160. The processing section 160 may for example be located in the cutting tool 100 itself (for example close to the sensors 130 or at the machine interface 140) or at some location outside the cutting tool 100.

The at least one sensor 130 may for example include one or more detectors. The sensors 130 (or detectors) may be of different types, as long as the sensors 130 are arranged (for example positioned and/or oriented) such that the selected sensors 130 are able to provide output enabling estimation of the rotational orientation of the cutting tool 100 with respect to the axis 111. The sensors 130 may for example include an accelerometer, a gyroscope, a digital spirit level, an analog spirit level, and/or a plumb bob. A sensor 130 provided in the form of a single spirit level integrated with the tool bar 110 (or with the cutting head 120) at more or less any position along the tool bar 110 (or the cutting head 120) may for example be able to provide output enabling estimation of the rotational orientation of the cutting tool 100 around to the axis 111. As described below with reference to FIG. 3, sensors 130 provided in the form of accelerometers may need to be suitable oriented for being able to provide output enabling estimation of the rotational orientation of the cutting tool 100 around to the axis 111.

Figure 2:
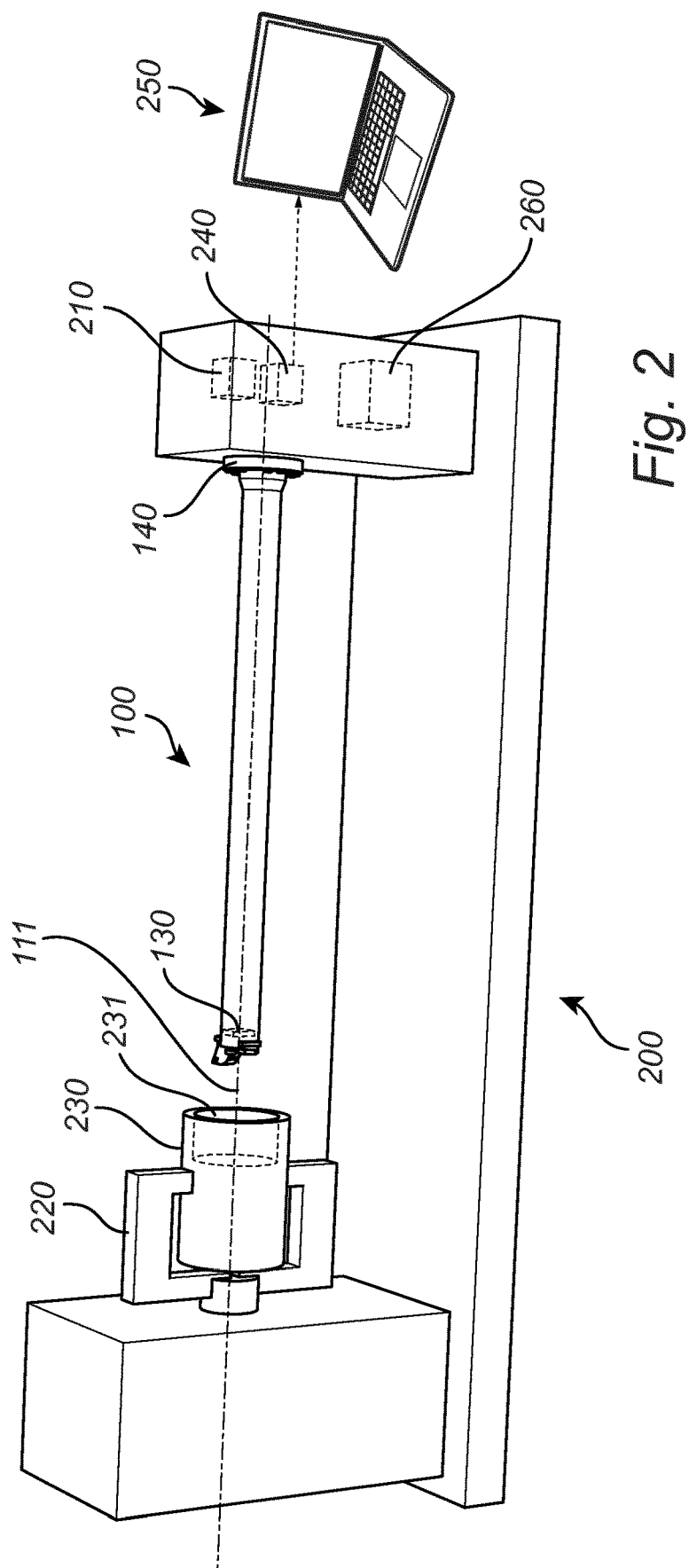
FIG. 2 is a perspective view of a turning machine comprising the cutting tool shown in FIG. 1, according to an embodiment.

FIG. 2 is perspective view of a turning machine 200 comprising the cutting tool 100 described with reference to FIG. 1, according to an embodiment. The cutting tool 100 has been mounted such that the axis 111 is horizontal. The turning machine 200 is adapted to estimate the rotational orientation of the cutting tool 100 with respect to the axis 111 using the output provided by the sensors 130. The turning machine 200 may for example comprise a processing section 210 configured to estimate the rotational orientation of the cutting tool 100 with respect to the axis 111 using the output provided by the sensors 130. The processing section 210 may for example be located in the cutting tool 100 (it may for example coincide with the processing section 160 described with reference to FIG. 1) or may be located in some other part of the turning machine 200.

The turning machine 200 comprises a spindle 220 for rotating a work piece 230. The cutting tool 100 is mounted via the machine interface 140 such that it may be moved towards the work piece 230 for cutting away material from the work piece 230 as the work piece 230 rotates. In the present embodiment, the work piece 230 has a hole 231 in which the cutting tool 100 may cut away material for expanding the hole 231.

The turning machine 220 may comprise a communication interface 240 configured to provide signaling indicating the estimated orientation. The signaling provided by the communication interface 240 may be provided via wired or wireless signals (for example via Bluetooth) to a remotely located device 250 having a user interface for indicating the estimated orientation to a human operator using the turning machine 200. The device 250 may for example be a personal computer or a hand held device such as a mobile phone or tablet computer.

The communication interface 240 may communicate with the processing section 210 wirelessly or via a wired connection. In some embodiments, the processing section 210 and/or the communication interface 240 may be located (or integrated in) the cutting tool 100.

The turning machine 220 may comprise a user interface 260 configured to indicate the estimated orientation to a user. The user interface 260 may for example be a screen arranged to visually convey the estimated orientation to the user, or an audio interface for signaling the orientation via sound.

The user interface 260, or the device 250, may indicate the estimated orientation itself, for example in the form of an angle. Alternatively (or additionally), the estimated orientation may be indicated in the form of a relation between the estimated orientation and a reference orientation. For example, a user may input (for example via the user interface 60 or the device 250) a reference orientation which is suitable for the cutting tool 100 in the current turning machine 200. The reference orientation may for example be at an angle of 0, 30, 45, 60 or 90 degrees relative to the horizontal plane. The user interface 260 or the device 250 may indicate whether the estimated orientation is within a tolerance range (or tolerance interval) around the selected reference orientation. The tolerance range may for example be a range within the insert 121 is able to provide an acceptable cutting performance. If the estimated orientation is within the tolerance range, this may for example be indicated clearly on a screen, for example by a green light and/or a text such as "correct orientation" or "desired orientation obtained". If the estimated orientation is not within the tolerance region, the user interface 260 or the device 250 may for example indicate in which direction to turn the cutting tool 100 around the axis 111 for obtaining an orientation closer to the reference orientation. In this way, a suitable angular position of the cutting tool 100 may be obtained.

As described above with reference to FIG. 1, different types of sensors 130 may be employed to estimate the orientation of the cutting tool 100. An embodiment will be described below in which accelerometers are employed as sensors 130. Since the skilled person realizes how to employ other types of sensors (for example one or more spirit levels) for the same purpose, a detailed description of such alternative embodiments is omitted in the present disclosure.

Figure 3:
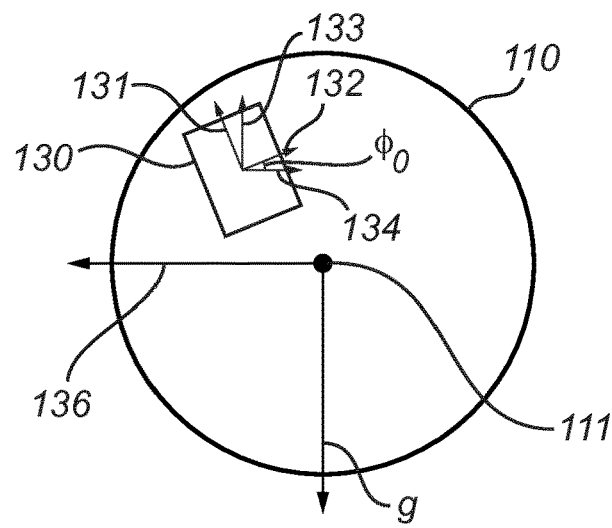
FIG. 3 is a cross sectional view along the line A-A' of the cutting tool shown in FIG. 1.

FIG. 3 is a cross sectional view along the line A-A' of the cutting tool 100, described with reference to FIG. 1. The sensors 130 are provided in the form of an accelerometer chip 130. The accelerometer chip 130 comprises accelerometers (or accelerometer circuits) arranged to measure acceleration in two directions 131 and 132. The accelerometers may for example be digital or analog accelerometers. The accelerations may be measured when the cutting tool 100 is not being employed for machining, i.e. when it is at rest (or at a fixed position) and is not employed for cutting material from the work piece 230. As gravity g has a known size (for example 9.81 m/s$^2$) and direction (downwards), the accelerations measured in the directions 131 and 132 may be employed together with trigonometry to estimate (or determine) the orientation of the chip 130 with respect to the axis 111. If the orientation of the chip 130 relative to the cutting tool 100 is known, the orientation of the cutting tool 100 with respect to the axis 111 may therefore be estimated (or determined, or computed). A detailed example of how to estimate the orientation of the cutting tool 100 will be described further below with reference to FIGS. 3 and 4.

Figure 4:
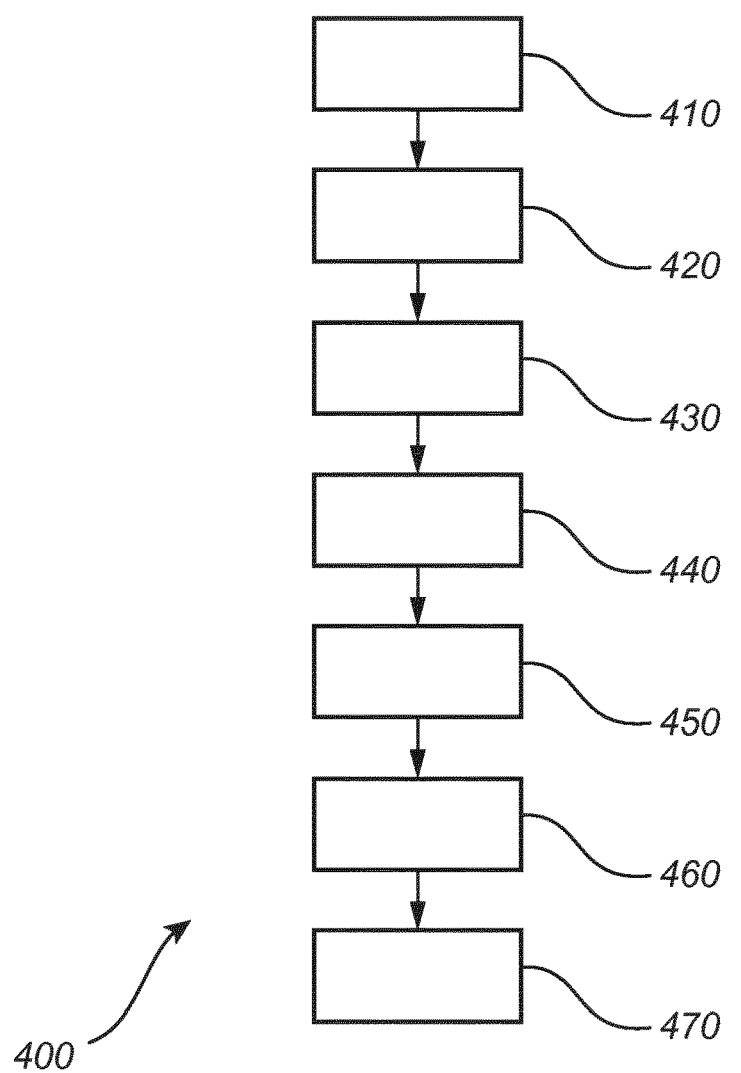
FIG. 4 is a flow chart of a method, according to an embodiment.

FIG. 4 is a flow chart of a method 400, according to an embodiment. The method 400 comprises providing 440 the cutting tool 100, providing 450 output by the sensors 130, and estimating 460 the rotational orientation of the cutting tool 100 with respect to the axis 111, based on the output provided by the sensors 130. As described above with reference to FIG. 3, the sensors 130 may be provided in the form of an accelerometer chip 130 configured to measure acceleration in at least two directions 131 and 132. As described above with reference to FIG. 2, the estimated orientation may be indicated 470 to a user via the user interface 260 or via the external device 250. Based on the estimated orientation, the user may rotate the cutting tool 100 around the axis 111 until a desired (or suitable) orientation is obtained. Once the desired orientation is obtained, the cutting tool 100 may be locked in that rotational position before being used for cutting material from the work piece 230.

The estimated orientation may be displayed at the user interface 260 or the device 250 together with a reference orientation (or desired orientation). The reference orientation may be selectable by the user, either freely within a range (or interval) such as 0-90 degrees, or from a finite set of selectable reference orientations. Hence, the method 400 may comprise the step of obtaining a selected reference orientation among a plurality of available reference orientations. Selection of the reference orientation may be performed prior to indicating 470 the estimated orientation to the user. If the reference orientation is set to coincide with the horizontal plane, the method 400 may be employed to check that the cutting tool 100 is level.

As the accelerometer chip 130 may deviate in orientation from the cutting tool 100 (or insert 121), the method 400 may include steps for calibrating the accelerometer chip 130 before the chip 130 is used for providing 450 the output employed for estimating 460 the orientation of the cutting tool 100. The calibration steps may for example be performed during manufacture or assembly of the cutting tool 100.

The method 400 may therefore comprise arranging 410 the cutting tool 100 at a reference rotational orientation $\phi_{ref}$ with respect to the axis 111. In other words, the cutting tool 100 is placed in a well-defined and known orientation $\phi_{ref}$ with respect to the gravitational field g, preferably with the insert 121 horizontally, pointing in the negative x-direction of the cutting tool 100 (i.e. in the radial direction 136, $\phi_{ref}=0$).

In the present embodiment, the directions 131 and 132 are perpendicular to each other and to the axis 111. The directions 131 and 132 may be referred to as y-axis 131 and x-axis 132, respectively, of the chip 130. Since the chip 130 has been mounted in the cutting tool 100, the two directions 131 and 132 are fixed relative to the cutting tool 100. The accelerometer chip 130 may preferably have been arranged in the cutting tool 100 with the x-axis 132 close to the x-axis 134 of the cutting tool 100 and the y-axis 131 close to the y-axis 133 of the cutting tool 100, as shown in FIG. 3.

The method 400 may continue by measuring 420 reference accelerations in the two directions 131 and 132 provided by the chip 130. The measured accelerations $A_{xref}$ and $A_{yref}$ may be expresses as $$A_{xref} = g \sin(\phi_{ref} - \phi_0)$$

$$A_{yref} = g \cos(\phi_{ref} - \phi_0)$$

where $\phi_0$ is the mounting angle of the chip 130 in the cutting tool 100. In other words, $\phi_0$ is the angle between the accelerometer x-axis 132 and the tool x-axis 134. With these definitions, the tool axis 111 coincides with the machine axis, while the radial direction 136 now is in the negative x-direction. When in use, the insert 121 is pointing in a direction $\phi_{rad}$ with respect to the horizontal direction. In turning machines such as a flat-bed lathe, it is often desirable to have $\phi_{rad}=0$ while in other turning machines it may be desirable to have $\phi_{rad}=240$ degrees (or 4p/3 radians).

The method 400 may continue by computing 430, based on the measured reference accelerations, a parameter value indicative of the mounting angle $\phi_0$ of the accelerometer chip 130 relative to the cutting tool 100. For example, the mounting angle $\phi_0$ itself may then be obtained via $$\phi_{ref} - \phi_0 = \tan^{-1}\left(\frac{A_{xref}}{A_{yref}}\right)$$

The method 400 may continue by arranging the cutting tool 100 at a new rotational orientation with respect to the axis 111. This corresponds to the step 440 of providing the cutting tool 100, described above.

The above described step of estimating 460 the rotational orientation of the cutting tool 100 with respect to the axis 111 comprises estimating a rotational orientation $\phi_{rad}$ the cutting tool 100 with respect to the axis 111 of based on the output provided by the sensors 130 and based on the parameter value $\phi_0$. More precisely, acceleration $A_{rad}$ in the radial direction 136 (horizontal) and the acceleration $A_{tan}$ in the tangential direction (vertical) are given by the following equations:

$$A_{rad} = -A_x \cos \phi_o + A_y \sin \phi_0$$

$$A_{tan} = -A_x \sin \phi_o - A_y \cos \phi_0$$

where $A_x$ is the acceleration along the x-axis of the chip 130 (corresponds to the direction 132) and $A_y$ is the acceleration along the y axis of the chip 130 (corresponds to the direction 131). As the mounting angle $\phi_0$ has been determined in the calibration procedure, the equation $$\phi_{rad} - \phi_0 = \tan^{-1}\left(\frac{A_{x0}}{A_{y0}}\right)$$

can be used to find the rotational orientation $\phi_{rad}$ of the cutting tool 100. A desired orientation of the cutting tool 100 may be obtained by plotting the difference between the current angle of orientation $\phi_{rad}$ and the desired angle of orientation for the cutting tool 100.

In the embodiment described with reference to FIG. 3, the directions 131 and 132 are perpendicular to each other. Embodiments may also be envisaged in which the directions 131 and 132 are transverse (or non-parallel) to each other, but not perpendicular to each other. As the skilled person is well-aware, accelerations measured in two directions which are not perpendicular to each other may be transformed, using standard trigonometric relations, into accelerations in two directions perpendicular to each other, as long as the angle between the two original directions is known. Similar computations as those described above may therefore be employed also in such settings.

Embodiments may also be envisaged in which the directions 131 and 132 are transverse (or non-parallel) to the axis 111 but not necessarily perpendicular to the axis 111. If the directions 131 and 132 are not perpendicular to the axis 111, acceleration may be measured also in one or more additional directions for estimating how the cutting tool 100 is oriented. The chip 130 may for example measure accelerations in three directions which are perpendicular to each other for estimating the orientation of the cutting tool 100.

Even a single accelerometer may be employed to estimate the rotational orientation of the cutting tool 100. If the accelerometer is directed downwards, the measured acceleration should be the standard gravity, i.e. about 9.81 m/s$^2$. If the accelerometer is rotated around the axis 111, the acceleration measured by the accelerometer should decrease. The direction of the accelerometer, and thereby of the cutting tool 100, may be estimated based on the difference between standard gravity and the acceleration measured by the accelerometer.

The person skilled in the art realizes that the present invention is by no means limited to the preferred embodiments described above. On the contrary, many modifications and variations are possible within the scope of the appended claims. For example, the at least one sensor 130 may for example be a single sensor (such as a single spirit level), rather than comprising multiple sensors. It will be appreciated that the sensors 130 may be positioned more or less anywhere along the tool bar 110 or the cutting head 120. It will also be appreciated that the orientation of the cutting tool 100 may be estimated prior to employing the cutting tool 100 in machining.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A cutting tool for use in turning, the cutting tool comprising:
    a tool bar extending along an axis;
    a cutting head located at the tool bar; and
    at least one sensor integrated with the tool bar or the cutting head, wherein the at least one sensor is arranged to, and is of a type to, provide an output enabling estimation of a rotational orientation of the cutting tool with respect to the axis, and wherein the at least one sensor comprises an accelerometer configured to measure acceleration in at least two directions.

2. The cutting tool of claim 1, wherein the at least one sensor is oriented to, and is of a type to, provide output enabling estimation of a rotational orientation of the cutting tool with respect to the axis.

3. The cutting tool of claim 1, wherein the at least one sensor is arranged in an interior of the tool bar or the cutting head.

4. A turning machine comprising the cutting tool as defined in claim 1, wherein the turning machine is arranged to estimate, using the output provided by the at least one sensor, a rotational orientation of the cutting tool with respect to the axis.

5. The turning machine of claim 4, further comprising a user interface configured to indicate the estimated orientation to a user.

6. The turning machine of claim 4, further comprising a communication interface configured to provide signaling indicating the estimated orientation.

7. The turning machine of claim 4, further comprising a processing section configured to estimate, using the output provided by the at least one sensor, the rotational orientation of the cutting tool with respect to the axis.

8. A method comprising:
    providing a cutting tool for use in turning, the cutting tool comprising a tool bar extending along an axis, a cutting head located at the tool bar, and at least one sensor integrated with the tool bar or the cutting head;
    providing output by the at least one sensor; and
    estimating, based on the output provided by the at least one sensor, a rotational orientation of the cutting tool with respect to the axis, wherein the at least one sensor comprises an accelerometer, and wherein providing output by the at least one sensor includes measuring acceleration in at least two directions.

9. The method of claim 8, further comprising indicating the estimated orientation to a user.

10. The method of claim 8, further comprising obtaining a reference rotational orientation with respect to the axis, and indicating, to a user, a relation between the estimated orientation and the reference orientation.

11. The method of claim 10, wherein the reference orientation is a selected reference orientation among a plurality of available reference orientations.

12. The method of claim 8, wherein each of the accelerometers are configured to measure acceleration in at least two fixed directions relative to the cutting tool, the method further comprising, prior to providing the output:
    arranging the cutting tool at a reference rotational orientation with respect to the axis;
    measuring, using the accelerometers, reference accelerations in the at least two fixed directions; computing, based on the measured reference accelerations, a parameter value indicative of a mounting angle of at least one of the accelerometers relative to the cutting tool; and
    arranging the cutting tool at a new rotational orientation with respect to the axis, wherein estimating the rotational orientation of the cutting tool with respect to the axis includes estimating, based on the output provided by the at least one sensor and based on the parameter value, a rotational orientation of the cutting tool with respect to the axis.

* * * * *